United States Patent
Meyer

(10) Patent No.: US 6,614,856 B1
(45) Date of Patent: Sep. 2, 2003

(54) INTERMEDIARY FREQUENCY INPUT QPSK DEMODULATOR

(75) Inventor: Jacques Meyer, Corenc (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/340,905

(22) Filed: Jun. 28, 1999

(30) Foreign Application Priority Data

Jun. 29, 1998 (FR) ............................................. 98 08431

(51) Int. Cl.$^7$ ................................................ H04L 27/22
(52) U.S. Cl. ...................................... 375/316; 375/329
(58) Field of Search ................................. 375/322, 324, 375/329, 261, 316, 279, 280, 331, 340; 341/155, 126; 327/50, 91

(56) References Cited

U.S. PATENT DOCUMENTS

| | | | |
|---|---|---|---|
| 4,174,489 A | 11/1979 | Guidoux et al. | ............ 325/320 |
| 5,142,553 A | 8/1992 | Rosenkranz | ................. 375/75 |
| 6,243,430 B1 * | 6/2001 | Mathe | ........................ 375/346 |

FOREIGN PATENT DOCUMENTS

| | | | | |
|---|---|---|---|---|
| DE | 0658007 A1 * | 6/1995 | ............ | H03M/3/02 |
| EP | A-0 197 708 | 10/1986 | ............ | H03D/3/00 |
| EP | A-0 658 007 | 6/1995 | ............ | H03M/3/02 |

* cited by examiner

Primary Examiner—Tesfaldet Bocure
Assistant Examiner—Demetria Williams
(74) Attorney, Agent, or Firm—Wolf, Greenfield & Sacks, P.C.; James H. Morris

(57) ABSTRACT

The present invention relates to a demodulator provided to extract two signals modulated in phase quadrature from an intermediary frequency signal, including two analog-to-digital converters receiving the intermediary frequency signal and clocked in phase opposition by a clock at a frequency smaller than the intermediary frequency, at least equal to the bandwidth of the modulated signals, and such that the central frequency of one of the aliased spectrums of the signal converted into digital is substantially equal to half the clock frequency; and two multipliers respectively receiving the outputs of the analog-to-digital converters and receiving at the same time a sequence of values 1, −1, 1, −1, 1 . . . at the clock rate.

16 Claims, 2 Drawing Sheets

INTERMEDIARY FREQUENCY INPUT QPSK DEMODULATOR

BACKGROUND OF THE INVENTION

1. Field of the Invention

The present invention relates to a so-called QPSK (Quadrature Phase-Shift Keying) demodulator for a signal simultaneously transmitting two binary signals I and Q on two carriers having the same frequency but in phase quadrature.

2. Discussion of the Related Art

FIG. 1 schematically and partially shows a conventional QPSK demodulator used to demodulate signals transmitted by satellite. A channel filter 10 receives a signal S from a first demodulator generally integrated to the reception head of a dish aerial pan. Channel filter 10 provides a so-called intermediary frequency signal IF, carrying the signals modulated on a 479.5 MHz carrier. Signal IF is provided to two multipliers 12 and 13 which further receive, respectively, two signals cos and sin, in phase quadrature. The cos and sin signals are provided by an oscillator 15 operating at a fixed frequency as close as possible to the 479.5-MHz intermediary frequency.

The baseband outputs Im and Qm of multipliers 12 and 13 are provided to two respective low-pass filters 17 and 18 which themselves provide the two demodulated signals I and Q. Actually, this demodulation is only a rough demodulation, since the frequency of oscillator 15 never is exactly equal to the intermediary frequency. To correct the demodulation error and extract the binary values from signals I and Q, signals I and Q generally undergo a digital processing in a digital signal processor (DSP) 20. Previously, signals I and Q are processed by analog-to-digital converters 22. The frequency of signals I and Q can generally reach 30 MHz, whereby converters 22 are clocked by a clock of at least 60 MHz.

In many applications, converters 22 and processor 20 are integrated in a circuit distinct from that which performs the other functions, especially to limit interference between the digital and analog portions of the demodulator.

SUMMARY OF THE INVENTION

An object of the present invention is to provide a complete QPSK demodulator in an integrated circuit which can be adapted in a particularly simple way to some demodulators which do not require all the demodulation functions that the integrated circuit can perform.

To achieve this and other objects, the present invention provides a demodulator devised to extract two signals modulated in phase quadrature from an intermediary frequency signal, including two analog-to-digital converters receiving the intermediary frequency signal and clocked in phase opposition by a clock of frequency smaller than the intermediary frequency, at least equal to the band width of the modulated signals, and such that the central frequency of one of the aliased spectrums of the signal converted into digital is substantially equal to half the clock frequency; and two multipliers respectively receiving the outputs of the analog-to-digital converters and receiving at the same time a sequence of values 1, −1, 1, −1, 1 . . . at the clock rate.

According to an embodiment of the present invention, the demodulator includes, in the path of the signal provided to one of the analog-to-digital converters, a clock change circuit.

According to an embodiment of the present invention, the demodulator includes, in the path of the signal provided by the other analog-to-digital converter, a filter of interpolation of one half clock period.

According to an embodiment of the present invention, the demodulator includes switches connected for, in a predetermined position, connecting two distinct signals to the two analog-to-digital converters, providing the same clock to the two converters, and continuously providing the two multipliers with value 1.

The foregoing objects, features and advantages of the present invention will be discussed in detail in the following non-limiting description of specific embodiments in connection with the accompanying drawings.

DETAILED DESCRIPTION

Figure 1:
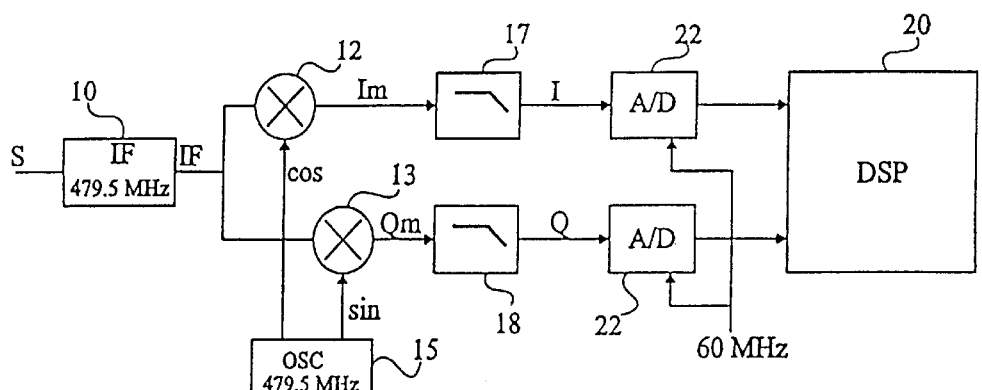
FIG. 1, previously described, schematically and partially shows a conventional QPSK demodulator.

To digitally perform a great part of the functions of a QPSK demodulator, the present invention provides performing an analog-to-digital conversion from intermediary frequency signal IF (FIG. 1). This raises some difficulties which will be avoided as discussed hereafter.

Intermediary frequency signal IF, as in the case of a reception of satellite-transmitted signals, is 479.5 MHz. An analog-to-digital converter meant to process this signal should, in theory, operate at twice this frequency, which is impossible with present technologies.

In fact, the intermediary frequency only is a carrier frequency. The data signal has a much more reduced passband, that is, 30 MHz. In this case, it is possible to sample the intermediary frequency signal at a frequency smaller than the intermediary frequency.

Figure 2:
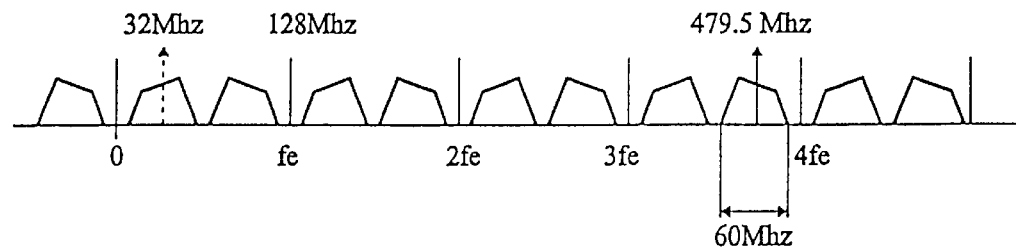
FIG. 2 illustrates spectrums of signals obtained when an analog-to-digital conversion is performed at a frequency smaller than the carrier frequency of a signal.

FIG. 2 is meant to illustrate this possibility. This drawing shows a frequency spectrum of the intermediary frequency signal once converted to digital. Before the conversion, the signal spectrum is centered on the intermediary 479.5-MHz frequency and extends over 30 MHz on either side of this intermediary frequency. If this signal is sampled at a frequency smaller than the intermediary frequency, the spectrum centered on 479.5 MHz aliases around the sampling frequency and the multiples of this frequency, including the zero frequency.

The sampling frequency must be greater than twice the bandwidth of the spectrum of the data signal (60 MHz), this, to respect Shannon's theorem. Further, for the spectrums of the digital data signal to alias without overlapping, sampling frequency fe must be chosen around one of values IF/(k−1/4) and IF/(k+1/4), where k is an integer. To fulfill these constraints in the present example, it is enough to sample intermediary frequency signal IF at 128 MHz.

FIG. 2 shows the spectrum obtained for such a sampling frequency. The spectrum of the data signal is symmetrically copied on either side of frequency fe, of the zero frequency and of the multiple frequencies of fe.

The choice of a sampling frequency of 128 MHz is an aspect of the present invention. Indeed, this choice provides a data spectrum centered on a 32-MHz carrier, which is one quarter of the sampling frequency. This results, as will be seen hereafter, in a considerable simplification of the digital function of multipliers 12, 13 and of oscillator 15 of the conventional demodulator of FIG. 1.

However, a 128-MHz sampling frequency is still difficult to obtain with current technologies. To overcome this problem, the present invention provides the use of two digital-to-analog converters clocked at half the sampling frequency fe by two clocks in phase opposition.

Figure 3:
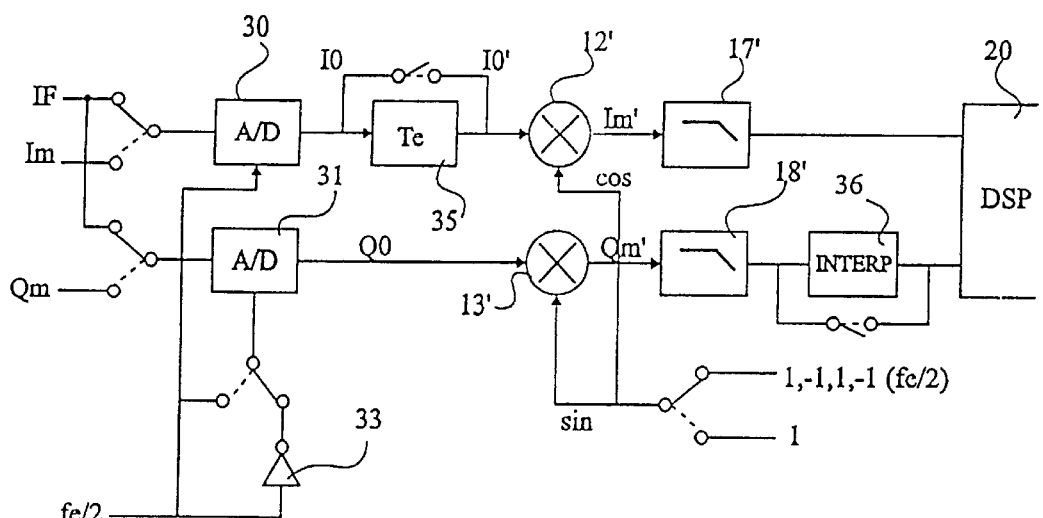
FIG. 3 schematically and partially shows an embodiment of a demodulator according to the present invention.

FIG. 3 shows an embodiment of a QPSK demodulator according to the present invention fulfilling the above mentioned conditions. Intermediary frequency signal IF is provided to two analog-to-digital converters 30 and 31. Converter 30 is clocked by a clock fe/2 at half the required sampling frequency fe, while converter 31 is clocked by the complement of clock fe/2, provided based on clock fe/2 by an inverter 33. Clock signal fe/2 is preferably perfectly symmetrical. For this purpose, clock fe/2 can be provided by a divider by two which receives a clock signal of double frequency.

With this configuration, converter 30 takes samples at the rising edges of clock fe/2 while converter 31 takes samples at the falling edges of clock fe/2. As a result, the two converters 30 and 31 behave as a single converter operating at a double frequency. Normally, the outputs of converters 30 and 31 should be multiplexed to provide multipliers 12 and 13 (FIG. 1) with a succession of samples at the required sampling frequency, that is, fe=128 MHz.

Figure 4A:
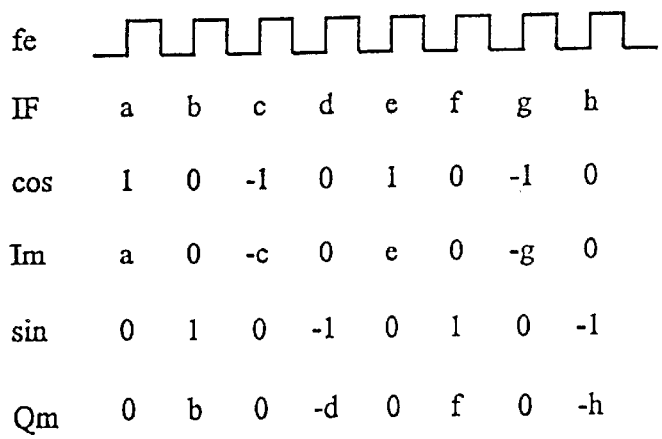
FIGS. 4A and 4B show timing diagrams used to describe the operation of a demodulator according to the present invention.

FIG. 4A illustrates in the form of a timing diagram the signals which would be used if the conventional circuit of FIG. 1 was to be directly transposed in the digital field. FIG. 4A illustrates the required sampling clock fe, a sequence of samples a, b, c, d . . . of the sampled intermediary frequency signal IF, a sequence of cos and sin values to be applied to multipliers 12 and 13 and the corresponding outputs Im and Qm of the multipliers. Due to the fact that sampling frequency fe is chosen so that one of the spectrums of the data signal is centered on one quarter (32 MHz) of this sampling frequency, the sequence of values of the cos signal is:

1, 0, −1, 0, 1, 0 . . .

while the sequence of values of the sin signal is:

0, 1, 0, −1, 0, 1 . . .

Thus, signal Im takes values:

a, 0,−c, 0, e, 0 . . .

and signal Qm takes values:

0, b, 0, −d, 0, f . . .

The values of signals Im and Qm follow one another at frequency fe, that is, 128 MHz, which normally imposes to the subsequent processing circuit to also operate at this frequency. With current present technologies, it is difficult to make circuits operating at this frequency.

However, the values 0 periodically occurring in signals Im and Qm have no influence upon the subsequent digital processing. A first simplification thus includes performing a decimation of signals Im and Qm to ignore the zero values, by processing signals Im and Qm at half (fe/2) their frequency. Thus, two respective non-zero values of signals Im and Qm can be processed in a same calculation cycle, although they originally correspond to different times (the zero values of one of the signals occur during non-zero values of the other signal). For this purpose, one of signals Im and Qm subsequently undergoes an interpolation of one half calculation period so that the couples of processed values correspond to the same times.

As shown in FIG. 3, outputs I0 and Q0 of converters 30 and 31 are not multiplexed to digitally reconstitute signal IF at frequency fe. On the contrary, they are provided to respective multipliers 12' and 13' acting, in digital form, as multipliers 12 and 13 of FIG. 1. A clock change circuit 35 is inserted, for example, between converter 30 and multiplier 12' so that the subsequent calculations be performed on both signals with the same clock.

Further, in this specific case, multipliers 12' and 13' appear to receive, as cos and sin signals, the same sequence of values 1, −1, 1, −1 . . . at frequency fe/2.

Outputs Im' and Qm' of multipliers 12' and 13' are provided to digital signal processor 20 via respective low-pass filters 17' and 18' corresponding, in digital form, to filters 17 and 18 of FIG. 1. A half-period interpolation filter 36, the function of which has been described hereabove, is inserted, for example, between filter 18' and DSP 20.

Figure 4B:
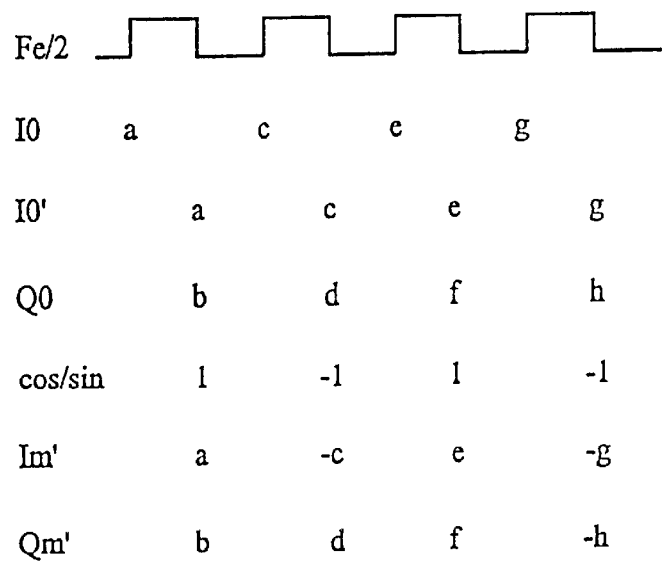

FIG. 4B shows a timing diagram showing successive values of different signals of the circuit of FIG. 3. At the rising edges of clock fe/2 which clocks converters 30 and 31, output I0 of converter 30 provides values a, c, e . . . corresponding to the samples of odd rank of signal IF. At the falling edges of clock fe/2, output Q0 of converter 31 provides samples b, d, f . . . corresponding to the samples of even rank of signal IF. Output I0' of delay circuit 35 provides samples a, c, e . . . in phase with the samples provided by output Q0 of converter 31. Output Im' of multiplier 12' takes successive values a, −c, e, −g, while output Qm' of multiplier 13' takes successive values b, −d, f . . . in phase with the values of output Im'.

It should be noted that values Im' and Qm' provided by the circuit of FIG. 3 correspond to the non-zero values of values Im and Qm illustrated in FIG. 4A. Further, values Im' of FIG. 4B have undergone a phase shift with respect to the values of FIG. 4A due to the clock change performed by circuit 35. The effects of this phase shift are compensated by interpolation filter 36.

The circuit of FIG. 3 can advantageously be adapted to demodulators in which the functions of elements 12 to 18 of FIG. 1 are performed outside the circuit of FIG. 3. For this purpose, the circuit of FIG. 3 is provided, as shown, with switches. In a position shown in full line, the switches enable the circuit to perform the previously-described functions, that is, digitally processing intermediary frequency signal IF.

In a second position of the switches, shown in dotted lines, the circuit of FIG. 3 can process baseband signals Im and Qm provided, for example, by analog multipliers 12 and 13 of FIG. 1. Then, signals Im and Qm are respectively provided to converters 30 and 31. Converter 31 is clocked by clock fe/2 instead of its complement. Clock change circuit 35 and interpolation filter 36 are short-circuited. Multipliers 12' and 13' permanently receive value 1.

Of course, the present invention is likely to have various alterations, modifications, and improvements which will readily occur to those skilled in the art. For example, interpolation filter 36 may be integrated in filter 18', which is more natural.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A demodulator for extracting two signals modulated in phase quadrature from an intermediary frequency signal, including:

two analog-to-digital converters receiving the intermediary frequency signal and clocked in phase opposition by a clock at a frequency smaller than the intermediary frequency, at least equal to the bandwidth of the modulated signals, and such that the central frequency of one of the aliased spectrums of the digital converted signal is substantially equal to half the clock frequency;

two multipliers respectively receiving the outputs of the analog-to-digital converters and receiving at the same time a sequence of values 1, −1, 1, −1, 1 . . . at the rate of said clock; and switches arranged for, in a predetermined position, connecting two distinct signals to the two analog-to-digital converters, providing the same clock to the two converters, and continuously providing the two multipliers with value 1.

2. The demodulator of claim 1, including, in the path of the signal provided to one of the analog-to-digital converters, a clock change circuit.

3. The demodulator of claim 2, including, in the path of the signal provided by the other analog-to-digital converter, a half clock period interpolation filter.

4. A demodulator for extracting two signals modulated in phase quadrature from an intermediary frequency signal, including:

two analog-to-digital converters that in a first operating mode receive the intermediary frequency signal and are clocked in phase opposition by a clock having a frequency that is smaller than the intermediary frequency and at least equal to the bandwidth of the modulated signals, and such that the central frequency of one of the aliased spectrums of the digital converted signal is substantially equal to half the clock frequency;

two multipliers that in the first operating state each receive an output of a respective one of the two analog-to-digital converters; and switches having a first position, used in the first operating mode, to provide the intermediary frequency signal to each of the two converters, and having a second position, used in a second operating mode, to provide each of the two analog to digital converters with a respective one of two signals that are distinct from one another;

wherein in the first position, the switches supply each of the two analog to digital converters with a respective one of two clocks in phase opposition, and in the second position, the switches provide each of the analog to digital converters with the same clock as one another.

5. The demodulator of claim 4, wherein the demodulator is an integrated circuit.

6. A demodulator for extracting two signals modulated in phase quadrature from an intermediary frequency signal, including:

two analog-to-digital converters that in a first operating mode receive the intermediary frequency signal and are clocked in phase opposition by a clock having a frequency that is smaller than the intermediary frequency and at least equal to the bandwidth of the modulated signals, and such that the central frequency of one of the aliased spectrums of the digital converted signal is substantially equal to half the clock frequency;

two multipliers that in the first operating state each receive an output of a respective one of the two analog-to-digital converters;

switches having a first position, used in the first operating mode, to provide the intermediary frequency signal to each of the two converters, and having a second position, used in a second operating mode, to provide each of the two analog to digital converters with a respective one of two signals that are distinct from one another;

wherein in the first position, the switches supply each of the multipliers with a sequence of values 1, −1, 1, −1, 1 at the rate of the clock frequency; and wherein in the second position, the switches supply each of the multipliers with a fixed value of 1.

7. A demodulator for extracting two signals modulated in phase quadrature from an intermediary frequency signal, including:

two analog-to-digital converters that in a first operating mode receive the intermediary frequency signal and are clocked in phase opposition by a clock having a frequency that is smaller than the intermediary frequency and at least equal to the bandwidth of the modulated signals, and such that the central frequency of one of the aliased spectrums of the digital converted signal is substantially equal to half the clock frequency;

two multipliers that in the first operating state each receive an output of a respective one of the two analog-to-digital converters; and switches having a first position, used in the first operating mode, to provide the intermediary frequency signal to each of the two converters, and having a second position, used in a second operating mode, to provide each of the two analog to digital converters with a respective one of two signals that are distinct from one another;

including a clock change circuit in a signal path between one of the analog-to-digital converters and the respective one of the two multipliers.

8. The demodulator of claim 7, including a half clock period interpolation filter, in the path of the signal provided by the other analog-to-digital converter.

9. A demodulator for extracting two signals modulated in phase quadrature from an intermediary frequency signal, including:

two analog-to-digital converters that in a first operating mode receive the intermediary frequency signal and are clocked in phase opposition by a clock having a frequency that is smaller than the intermediary frequency and at least equal to the bandwidth of the modulated signals, and such that the central frequency of one of the aliased spectrums of the digital converted signal is substantially equal to half the clock frequency;

two multipliers that in the first operating state each receive an output of a respective one of the two analog-to-digital converters; and means for providing the intermediary frequency signal to each of the two converters in the first operating mode, and for providing each of the two analog to digital converters with a respective one of two signals that are distinct from one another, in a second operating mode;

wherein said means comprises means for supplying each of the two analog to digital converters with a respective one of two clocks in phase opposition in the first operating mode, and for providing each of the analog to digital converters with the same clock as one another in the second operating mode.

10. The demodulator of claim 9, wherein the demodulator is an integrated circuit.

11. A demodulator for extracting two signals modulated in phase quadrature from an intermediary frequency signal, including:

two analog-to-digital converters that in a first operating mode receive the intermediary frequency signal and are clocked in phase opposition by a clock having a frequency that is smaller than the intermediary frequency and at least equal to the bandwidth of the modulated signals, and such that the central frequency of one of the aliased spectrums of the digital converted signal is substantially equal to half the clock frequency;

two multipliers that in the first operating state each receive an output of a respective one of the two analog-to-digital converters; and means for providing the intermediary frequency signal to each of the two converters in the first operating mode, and for providing each of the two analog to digital converters with a respective one of two signals that are distinct from one another, in a second operating mode;

wherein said means comprises means for supplying each of the multipliers with a fixed value of 1 in the second operating mode.

12. A demodulator for extracting two signals modulated in phase quadrature from an intermediary frequency signal, including:

two analog-to-digital converters that in a first operating mode receive the intermediary frequency signal and are clocked in phase opposition by a clock having a frequency that is smaller than the intermediary frequency and at least equal to the bandwidth of the modulated signals, and such that the central frequency of one of the aliased spectrums of the digital converted signal is substantially equal to half the clock frequency;

two multipliers that in the first operating state each receive an output of a respective one of the two analog-to-digital converters; and means for providing the intermediary frequency signal to each of the two converters in the first operating mode, and for providing each of the two analog to digital converters with a respective one of two signals that are distinct from one another, in a second operating mode;

including a clock change circuit in a signal path between one of the analog-to-digital converters and the respective one of the multipliers.

13. The demodulator of claim 12, including a half clock period interpolation filter, in the path of the signal provided by the other analog-to-digital converter.

14. A method for use in a demodulator for extracting two signals modulated in phase quadrature from an intermediary frequency signal, the demodulator including:

two analog-to-digital converters;

two multipliers that in the first operating state each receive an output of a respective one of the two analog-to-digital converters; and means for providing the intermediary frequency signal to each of the two converters in the first operating mode, and for providing each of the two analog to digital converters with a respective one of two signals that are distinct from one another, in a second operating mode;

the method comprising:

in a first operating mode, supplying the intermediary frequency signal to each of the two analog to digital converters and clocking each of the two analog to digital converter in phase opposition by a clock having a frequency that is smaller than the intermediary frequency and at least equal to the bandwidth of the modulated signals, and such that the central frequency of one of the aliased spectrums of the digital converted signal is substantially equal to half the clock frequency, the multipliers each receiving an output of a respective one of the two analog-to-digital converters; and and in a second operating mode, providing each of the two analog to digital converters with a respective one of two signals that are distinct from one another;

further comprising in the first operating mode, supplying each of the two analog to digital converters with a respective one of two clocks in phase opposition, and in the second operating mode, supplying each of the two analog to digital converters with the same clock as one another.

15. The method of claim 14, wherein the demodulator is an integrated circuit.

16. A method for use in a demodulator for extracting two signals modulated in phase quadrature from an intermediary frequency signal, the demodulator including:

two analog-to-digital converters;

two multipliers that in the first operating state each receive an output of a respective one of the two analog-to-digital converters; and means for providing the intermediary frequency signal to each of the two converters in the first operating mode, and for providing each of the two analog to digital converters with a respective one of two signals that are distinct from one another, in a second operating mode;

the method comprising:

in a first operating mode, supplying the intermediary frequency signal to each of the two analog to digital converters and clocking each of the two analog to digital converter in phase opposition by a clock having a frequency that is smaller than the intermediary frequency and at least equal to the bandwidth of the modulated signals, and such that the central frequency of one of the aliased spectrums of the digital converted signal is substantially equal to half the clock frequency, the multipliers each receiving an output of a respective one of the two analog-to-digital converters; and and in a second operating mode, providing each of the two analog to digital converters with a respective one of two signals that are distinct from one another;

further comprising supplying each of the multipliers with a fixed value of 1 in the second operating mode.

* * * * *